(No Model.)

G. HENKEL & H. VON ROM.
APPARATUS FOR PICKLING MEATS.

No. 603,082. Patented Apr. 26, 1898.

Witnesses:
Chas. W. Thomas.
Eugenie A. Persider.

Inventors.
Gustav Henkel
Hermann von Rom
By A. Faberau Faurs
Attorney.

United States Patent Office.

GUSTAV HENKEL, OF CASSEL, AND HERMANN VON ROM, OF STUTTGART, GERMANY.

APPARATUS FOR PICKLING MEATS.

SPECIFICATION forming part of Letters Patent No. 603,082, dated April 26, 1898.

Application filed June 28, 1895. Serial No. 554,321. (No model.)

*To all whom it may concern:*

Be it known that we, GUSTAV HENKEL, a subject of the King of Prussia, residing at Cassel, and HERMANN VON ROM, a subject of the King of Würtemberg, residing at Stuttgart, Germany, have invented an Improved Apparatus for Pickling; and we do hereby declare the following to be a clear and exact description of the invention.

Our invention has reference to improvements in apparatus for pickling meats, and particularly to one adapted for repeated short immersions of the meat in the brine.

To this end our invention consists, essentially, in a plant for pickling meats, comprising a main pickle-tank, a series of vats, a distributing-pipe leading from the main tank to the vats, return-pipes leading from the vats to the main tank, a pump for establishing circulation from the vats to the main tank and back to the vats, and means for immersing and withdrawing the meat and for suspending and moving it on the track.

The nature of our invention will best be understood when described in connection with the accompanying drawings, in which—

Figure 1:
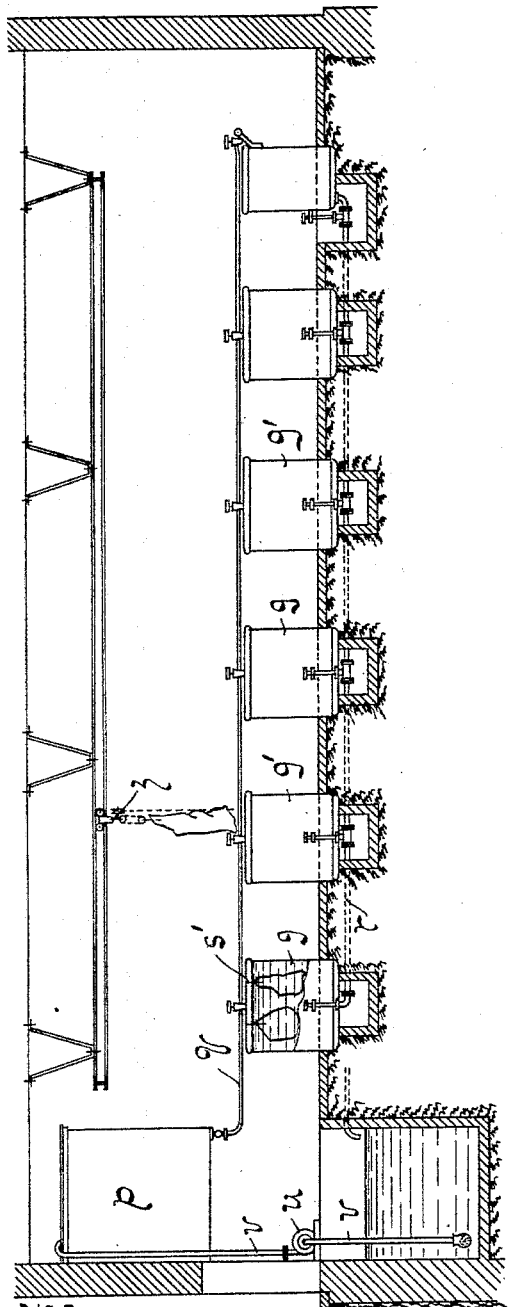
Figure 2:
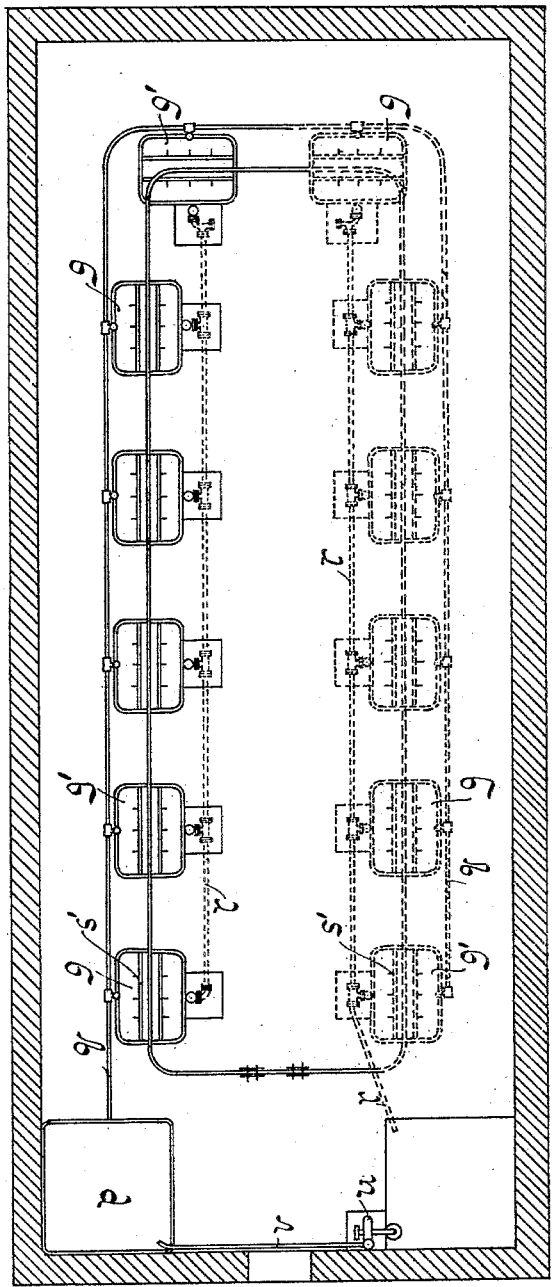

Figure 1 represents an elevation of an apparatus constructed according to our invention. Fig. 2 is a plan view of the same.

Similar letters of reference designate corresponding parts throughout both views of the drawings.

Referring to the drawings, the letter $p$ designates the main pickle-tank, wherein the brine may be prepared and in which it is kept at any suitable strength and temperature. From this main tank the brine is conducted to the several vats $g$ $g'$ through a pipe $q$, provided with suitable valves for controlling the outflow. By means of return-pipes $r$, a pump $u$, and a pipe $v$ circulation of brine is established from the vats $g$ $g'$ back to the main tank $p$, and from thence to the vats. A suitable well from which the pump draws may be interpolated. Suitable suspension devices $s'$ $s'$ are provided for each vat, and the meat is raised, lowered, and moved horizontally by a trolley $z$, provided with a suitable hoisting device and running on an overhead track. The latter devices may be of any suitable construction.

What we claim as new is—

In a plant for pickling meat, the combination of a main pickle-tank, a series of vats, a distributing-pipe leading from the main tank to the vats, return-pipes leading from the vats to the main tank, a pump for establishing circulation from the vats to the tank and back to the vats, an overhead track, and means substantially as described for immersing and withdrawing the meat and for suspending and moving it on the track, substantially as and for the purpose set forth.

In witness whereof we have hereunto signed our names in the presence of two subscribing witnesses.

GUSTAV HENKEL. [L. S.]
  HERMANN VON ROM. [L. S.]

Witnesses as to Gustav Henkel:
 ALFRED BODE,
 HANS W. FRIDERICHSEN.

Witnesses as to Hermann von Rom:
 WM. HAHN,
 L. HOFFMANN.